(12) United States Patent
Kramer et al.

(10) Patent No.: US 7,127,742 B2
(45) Date of Patent: Oct. 24, 2006

(54) ESTABLISHING A SECURE CONNECTION WITH A PRIVATE CORPORATE NETWORK OVER A PUBLIC NETWORK

(75) Inventors: Michael Kramer, Yonkers, NY (US); Donald J. Kadyk, Bothell, WA (US); Neil S. Fishman, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 09/768,673

(22) Filed: Jan. 24, 2001

(65) Prior Publication Data

US 2002/0099957 A1    Jul. 25, 2002

(51) Int. Cl.
G06F 9/00 (2006.01)
G06F 15/16 (2006.01)
H04L 9/00 (2006.01)
H04K 1/00 (2006.01)

(52) U.S. Cl. ............... 726/15; 726/12; 726/14; 713/150; 713/152; 713/154; 713/160; 713/163; 380/255; 380/256; 380/270; 380/272; 380/274; 709/250; 709/227; 709/228; 709/229

(58) Field of Classification Search ............ 713/201, 713/150, 152, 154, 160, 161, 162, 163; 380/255, 380/256, 270, 272, 274; 709/250, 227, 228, 709/229; 726/15, 12, 14
See application file for complete search history.

(56) References Cited

U.S. PATENT DOCUMENTS 5,944,823 A    8/1999  Jade et al. ............... 713/201

6,081,900 A * 6/2000 Subramaniam et al. ..... 713/201
6,151,628 A * 11/2000 Xu et al. .................... 713/201
6,317,831 B1 * 11/2001 King ........................... 713/171
6,324,648 B1 * 11/2001 Grantges, Jr. ............... 709/229

FOREIGN PATENT DOCUMENTS

| EP | 0999673 A2 | 5/2000 |
|---|---|---|
| WO | WO 98/57465 | 12/1998 |
| WO | WO 01/02935 | 1/2001 |

OTHER PUBLICATIONS

En, Laurence Lee Min, "Wireless Application Protocol Wireless Transport Layer Security" (WAP WTLS), Wireless Application Forum, Apr. 30, 1998.*

(Continued)

*Primary Examiner*—Matthew Smithers
*Assistant Examiner*—Courtney D. Fields
(74) *Attorney, Agent, or Firm*—Workman Nydegger (57) ABSTRACT

An external client securely accesses a private corporate network using a communications device, but without the communications device being required to communicate through the private corporate network when communicating with resources external to the private corporate network. The external client establishes a connection with the private corporate network over the public network such as the Internet using, for example, Transmission Control Protocol (TCP). The external client then provides security to the connection by running, for example, the Secure Socket Layer (SSL) protocol over the TCP protocol. During the ensuing session with the private corporate network, the communications device establishes a subsequent connection(s) with the external resource.

23 Claims, 4 Drawing Sheets

OTHER PUBLICATIONS

Dr. James H. Scharen-Guivel, "Wireless Virtual Private Networks in the Mobile Enterprise", The 2002 Telecommunications Review, Mitretek Systems, pp. 43-52.*

Chris Johnson, "Understanding and Implementing Microsoft Terminal Services and Citrix MetaFrame", SANS Institute, Aug. 13, 2001, pp. 1-8.*

En, Laurence Lee Min, "Wireless Application Protocol Wireless Transport Layer Security" (WAP WTLS), Wireless Application Forum, Apr. 30, 1998.*

Anderson, John, *IN Controls for Broadband Networks*, 1998 IEEE, pp. 361-371.

Apostolopoulos, George; Aubespin, David; Peris, Vinod; Pradhan, Prashant; and Saha, Debanjan, *Design, Implementation and Performance of a Content-Based Switch*, IEEE INFOCOM 2000, pp. 1117-1126.

Hunt, Ray, *Internet-Intranet firewall security—policy, architecture and transaction services*, 1998 Elsevier Science B.V., pp. 1107-1123.

Luotonen, Ari, *Web Proxy Servers*, 1998 Netscape Communications Corporation, pp. 228-229, 338-341.

Przygienda, Tony; Droz, Patrick; and West, Colin, *Proxy PNNI Augmented Routing (Proxy PAR)*, 1998 IEEE, pp. 371-377.

* cited by examiner

ESTABLISHING A SECURE CONNECTION WITH A PRIVATE CORPORATE NETWORK OVER A PUBLIC NETWORK

BACKGROUND OF THE INVENTION

1. The Field of the Invention

The present invention relates to the field of network communication. More specifically, the present invention relates to establishing a secure connection to a private corporate network over a public network without being restricted to communication through the private corporate network.

2. The Prior State of the Art

The Internet has transformed the way people communicate and do business. For example, electronic mail allows individuals to send electronic messages and attached documents world-wide in a matter of hours, minutes, or often even seconds. Information regarding an almost limitless amount of subjects may be retrieved from remote locations and presented to the user. Chat rooms and instant messaging allow individuals to electronically discuss various topics even though the participants are remotely located from each other.

In addition to the above forms of communication, it is often desirable for an authorized user of a private corporate network to obtain access to information in a private corporate network. For example, a user may typically use a client within a private corporate network, the corporate network being separated from the remainder of the Internet using a firewall or other security measures. That private corporate network may contain data that is interesting to the user such as documents, e-mails, and so forth. As the user travels, the user may desire to remotely access the data in the private corporate network using a client external to the private corporate network.

In order to access a private corporate network from outside of a private corporate network, one must typically establish a connection over a public network, such as, for example, the Internet. Since the data communicated between the private corporate network and the client outside the private corporate network is often sensitive in nature, the link over the public network should be secure so as to avoid eavesdropping.

One conventional protocol used to establish this secure connection over the public network is called Point-to-Point Tunneling Protocol (PPTP). PPTP allows an external client to establish a secure Virtual Private Network (VPN) link to a VPN access server within the private corporate network so as to guard against eavesdropping by those in the public network. Establishing a PPTP connection between a private corporate network and an external client is an effective and secure way to allow the external client access to resources within the private corporate network.

However, as long as the PPTP link is established using a communication device such as a network card or modem, any communication from the communication device must occur through the PPTP link. In a client that has only one active communication device, this means that the while the PPTP link is active, the client can only communicate through the PPTP link.

Thus, if the external client is to communicate with a Web site outside of the private corporate network, the client must either discontinue the PPTP link or else submit requests through the PPTP link to a VPN access server in the private corporate network (assuming the external client only has one active communications device). The VPN access server would supply the request to the proxy server in the private corporate network. The proxy server would then establish a connection to the desired Web site.

In the sense that all communications from the external client to resources outside of the private corporate network must pass through the proxy server of the private corporate network, it is as though the external client is part of the private corporate network. Thus, establishing a PPTP link to access a private corporate network restricts all communications going to and from the client to the PPTP link. This introduces inefficiencies in routing and causes the private corporate network to allocate memory and processing time to handling such requests even thought the desired resource and the external client are both outside of the private corporate network.

In addition, however, the communications going out of the private corporate network often open up the private corporate network to security breaches by individuals analyzing outgoing messages from the private corporate network. The use of PPTP forces communications from the communication device of the external client to pass through the private corporate network and possibly back out to the public network thus unnecessarily causing the private corporate network to establish communications outside of the private corporate network.

What is therefore desired are ways of allowing outside clients to establish a connection with their private corporate networks over a public network without restricting the client to communication through the private corporate network.

SUMMARY OF THE INVENTION

The present invention allows the communications device of clients that are external to a private corporate network to securely access the private corporate network. Conventional ways of making this connection force the communications device of the external client to communicate through the secure connection no matter what the ultimate desired resources. Thus, for example, if the external client desired to communicate with another resource external to the private corporate network while the secure connection was established, the external client would have to first direct the request through the secure connection to the private corporate network. The private corporate network would then route the request through its proxy server and send the request out to the desired external resource.

The present invention eliminates the requirement that requests from a single communications device of an external client always be directed through the private corporate network. This is accomplished by providing security to the connection with the private corporate network in such a way so as to preserve the ability of the communications device to establish yet other connections with other resources outside of the private corporate network. This is accomplished by using a protocol that operates at or above the logic layer that establishes connections (i.e., the socket layer) in the protocol stack. Examples of such protocols include the Secure Socket Layer (SSL) protocol and the Wireless Transport Layer Security (WTLS) protocol.

There are added advantages to using these protocols to secure a connection. For instance, if a connection is broken, these protocols can reestablish the connection without repeating all of the handshaking that occurred to establish the connection in the first place. The protocols typically accommodate the caching of session state information such as encryption keys so that future exchanges to retrieve such keys are not necessary when reestablishing a previously established connection.

The method includes the external client establishing a connection with the private corporate network over the public network using the communication device. This connection may be established using, for example, Transmission Control Protocol (TCP). The external client then provides security to the connection. This security is provided using the established connection to exchange information such as certificates and encryption keys. The security may be established by running, for example, the SSL protocol over the TCP protocol. The external client maintains a session that uses the secure connection to communicate with the private corporate network. During this session, the communications device retains the ability to establish a separate and distinct connection with another resource outside of the private corporate network. The communications device then establishes a connection with the external resource.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

In accordance with the present invention, a method and system are described for a client communications device to establish a secure connection over a public network with a server computer system in a private corporate network. This secure connection is established using a protocol that allows the network interface device to retain the ability to make further connections. For example, the network interface device may maintain a Secure Socket Layer (SSL) session with the server in the private corporate network while establishing a separate connection with Web sites on the Internet. This allows the client to access resources securely from the private corporate network while simultaneously accessing other resources in the public network.

This description defines certain terms that are to be applied throughout this description and the accompanying claims. These terms are provided in order to clearly claim the invention and describe embodiments thereof. The definitions of the terms may or may not reflect common usage of the terms. In this light, the definitions are not intended to be applied outside of this description and accompanying claims.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise tangible computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
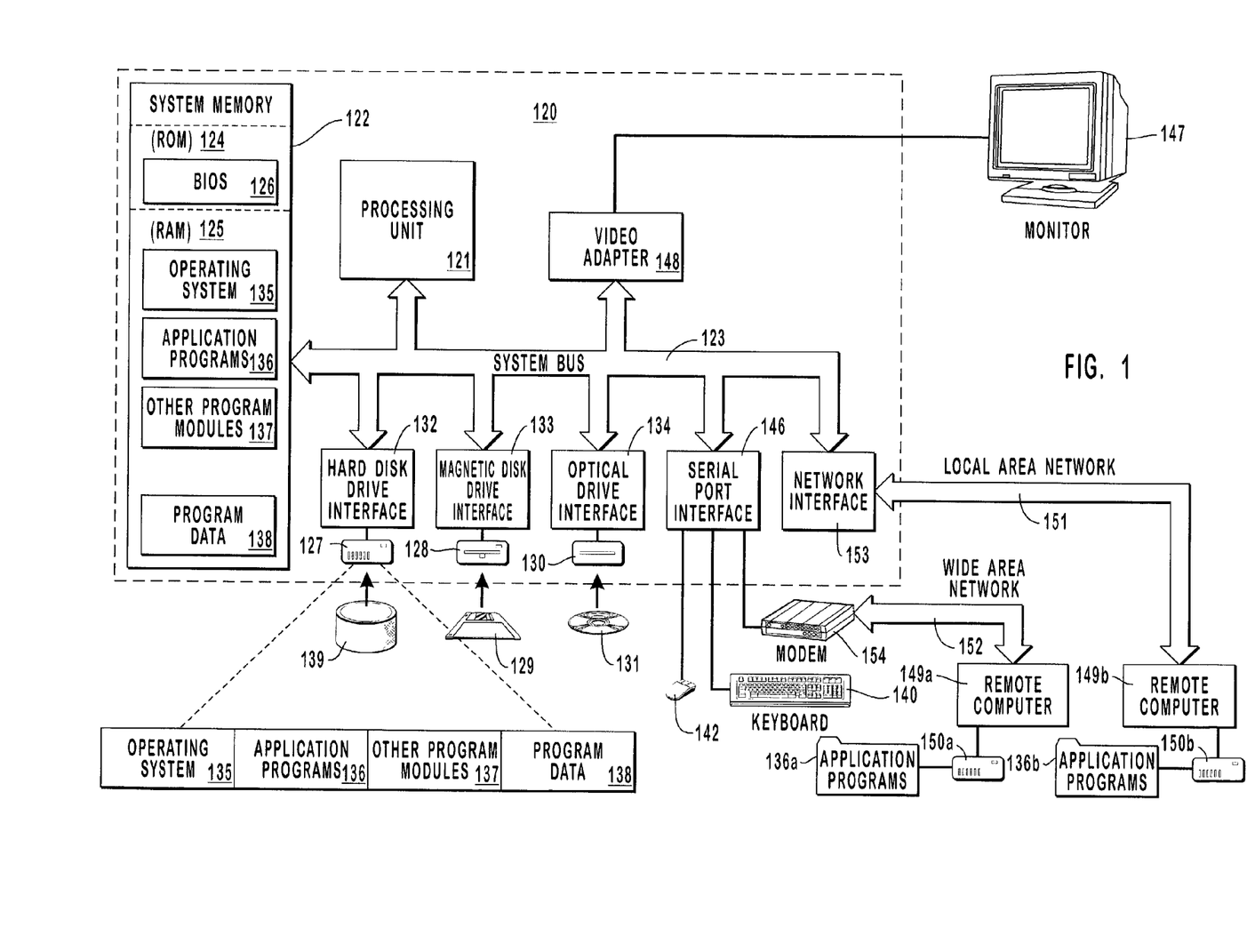
FIG. 1 illustrates an exemplary system that provides a suitable operating environment for the present invention.

FIG. 1 and the following discussion are intended to provide a brief, general description of a suitable computing environment in which the invention may be implemented Although not required, the invention will be described in the general context of computer-executable instructions, such as program modules, being executed by computers in network environments Generally, program modules include routines, programs, objects, components, data structures, etc. that perform particular tasks or implement particular abstract data types. Computer-executable instructions, associated data structures, and program modules represent examples of the program code means for executing steps of the methods disclosed herein The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
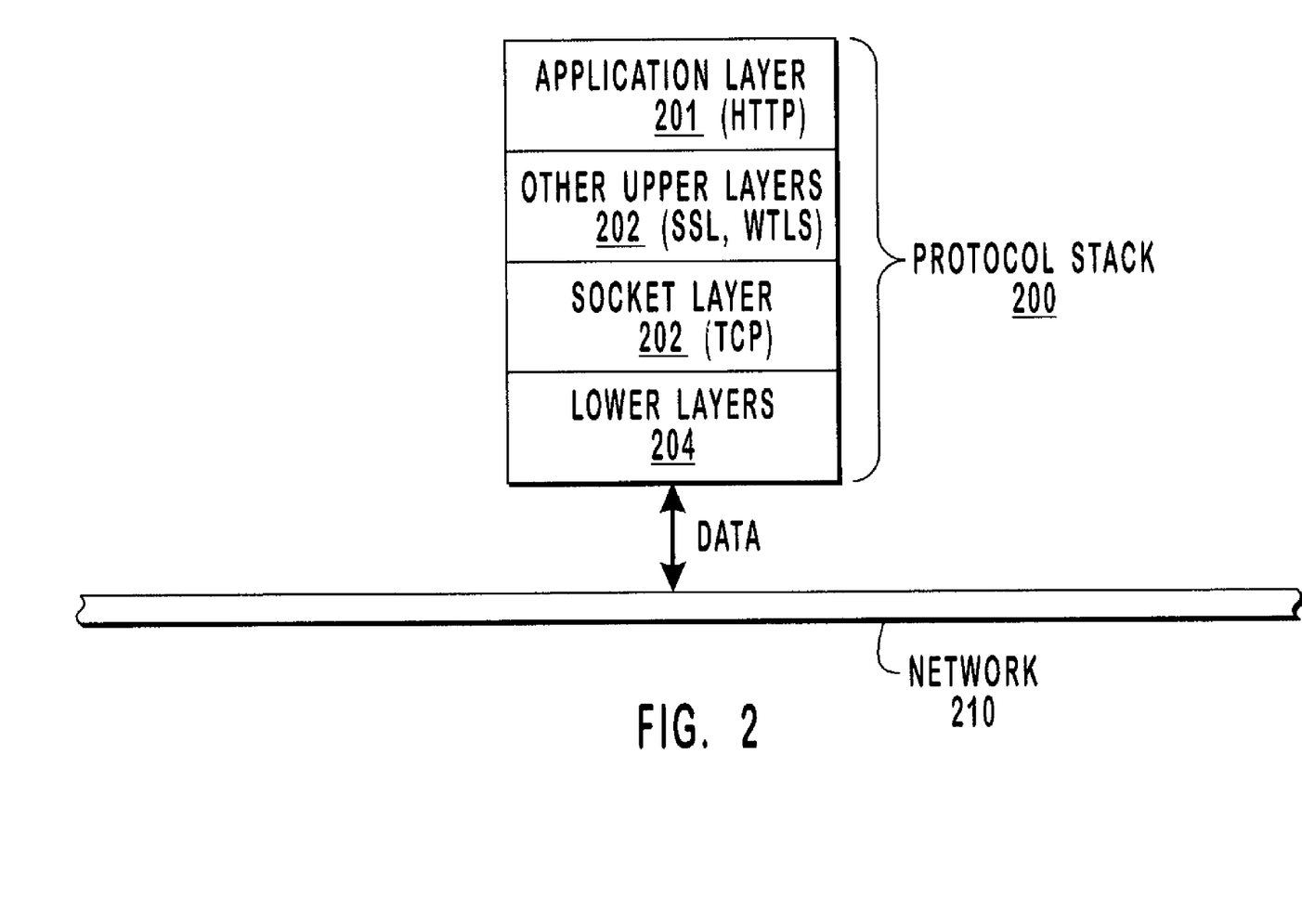
FIG. 2 schematically illustrates a layered protocol stack that may be used to implement the principles of the present invention.

FIG. 2 illustrates a layered software structure 200 or "protocol stack" that may be used to communicate between an application program and a network 210. The protocol stack 200 includes various layered modules 201 through 204 that are used to send and receive data over the network 210. These modules 201 through 204 are an example of the modules 137 made available to the computer 120 of FIG. 1. Generally speaking, each layer of the protocol stack performs certain functions that add onto the functionality provided by lower layers. Briefly stated, an upper layer has the power to invoke the services of a lower layer but does not know the details of how the lower layer will accomplish the service. In contrast, a lower layer has no power to invoke the services of upper layers.

The application layer 201 communicates directly with the application program such as application program 136 that has a network communication function. Examples of such application programs include Web browsers, file transfer applications, e-mail applications and other such communication-oriented application programs. These application programs typically receive data passed up the protocol stack 200 from the network 210 and/or pass data down through the protocol stack 200 for transmission on the network 210. A typical application layer 201 is the HyperText Transfer Protocol (HTTP).

Other upper layers 202 include any software modules that reside above the socket layer 203. In this description and in the claims, an upper module being "above" a lower module means that the upper module passes control over data to the lower module when transmitting the data over the network. The socket layer 203 is responsible for establishing a connection with other nodes over one or more networks. An example of a socket layer includes Transmission Control Protocol (TCP) which, among other things, establishes connections between two nodes in a network.

As long as processing unit 121 is, at any particular time, executing instructions of the socket layer 203, the application layer 201, or at the other upper layers 202 above the socket layer 203, the application program retains the ability to establish multiple connections using a single communications device such as a modem or network interface card. This is because the socket layer may, at that particular time, be used or called upon to establish further connections even if connections are already established.

Lower layers 204 include those protocol layers that reside below the socket layer 203. Such layers might include, for example, the Internet Protocol (IP), and Point-to-Point Protocol (PPP) upon which the Point-to-Point Tunneling Protocol (PPTP) is built. If the processing unit 121, at any particular time, is executing instructions of any of the lower layers 204 beneath the socket layer 203, the application program will not be able to establish any further connections using a communications device already in use. This is because the instruction will not access the socket layer 203 since the lower layers in protocol stack are not typically designed to control upper layers in the protocol stack.

Figure 3:
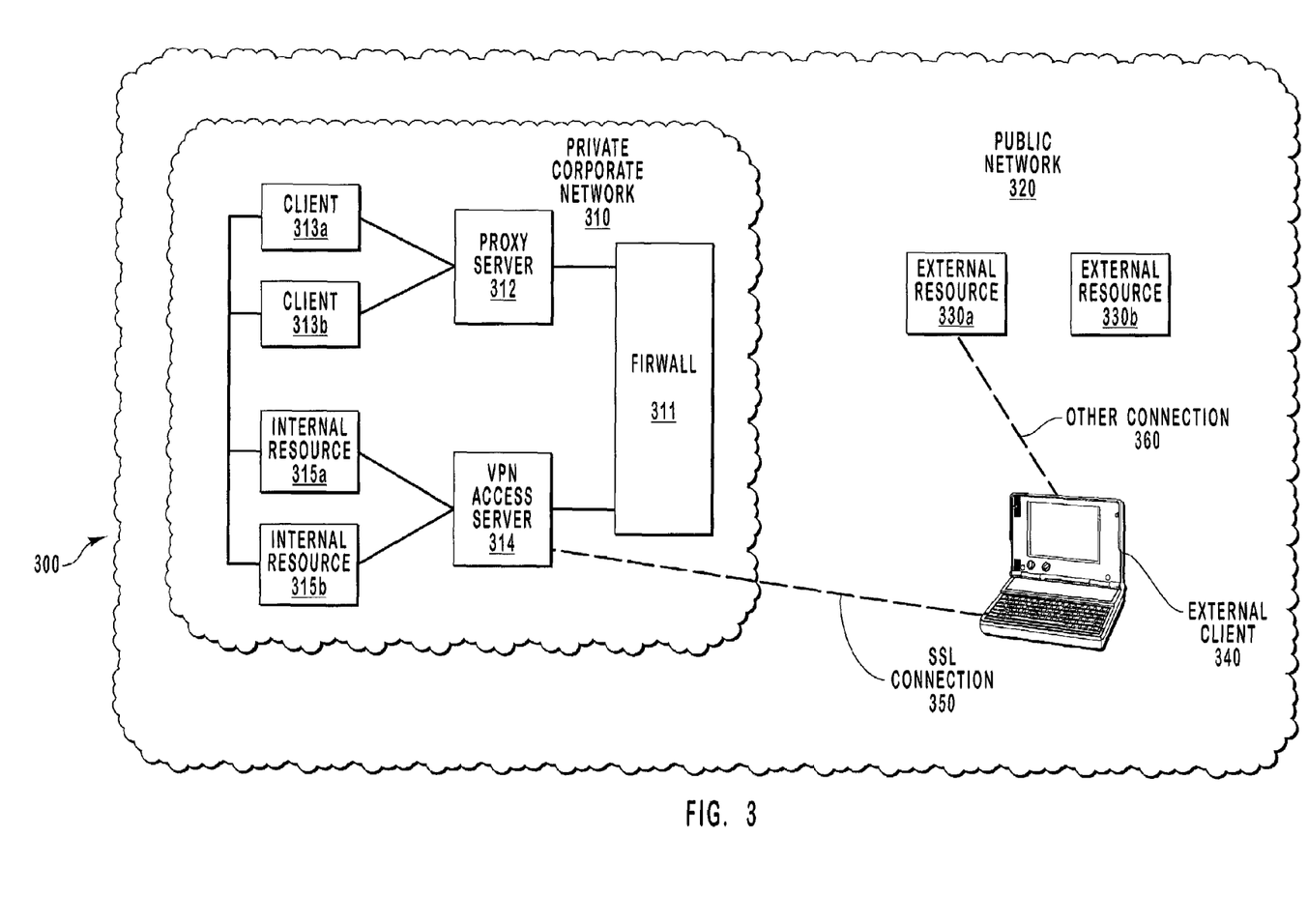
FIG. 3 illustrates a suitable network architecture in which the present invention may be implemented.

FIG. 3 schematically illustrates a suitable network environment 300 in which the present invention may operate. The environment includes a private corporate network 310 that resides within a public network 320.

In this description and in the claims, a "corporate network" is defined as a network of computers that is maintained by an administrative entity. The term is not to be interpreted as being limited to networks that are administered for a legal corporation although the term is used because that is often the case. In this description and in the claims, a "private corporate network" is defined as a corporate network that is used by a limited number of authorized users. In order to attain reasonable assurance that the private corporate network will only be used by authorized users, precautions are taken to guard against unauthorized users accessing an internal resource or eavesdropping on network traffic internal to the private corporate network. For this reason, the private corporate network is typically isolated from the outside public network, except through certain computers through which the public at large may not gain access.

For example, firewall 311 prevents the general public from accessing internal resources (e.g., internal resources 315a and 315b) of the private corporate network 310. In addition, a corporate network also typically includes a proxy server such as proxy server 312, which is designed to handle all requests (typically HTTP requests) from clients (e.g., clients 313a and 313b) internal to the private corporate network 310. The clients 313 may each be structured as described above for computer 120 in FIG. 1.

The firewall 311 is configured to deny any outgoing requests that do not originate from the proxy server 312. Consequently all outgoing requests from the clients 313 are made to the proxy server 312. The user requests includes the external Uniform Resource Identifier (URI) for the external resource the user is interested in. However, the browser client 313 is configured to send the request directly to the proxy server 312 with the desired URI contained therein. After optionally checking that the browser client is authorized to make the request, the proxy server 312 then generates a separate request to the desired external resource on behalf of the browser client. The server that contains the desired content (called an "origin server") then receives the request. From the origin server's point of view, the proxy server 312 generated the request. The request does not include any identifying information regarding the client 313 that requested the resource. Thus, the proxy server 312 protects the identity of clients within the private corporate network 310.

Thus, a proxy server is used by a private corporate network to serve as a channel through which clients make outgoing access requests. In contrast, a "reverse proxy server" is a resource that protects a single server or a group of load-balanced servers receiving incoming access requests. Thus, a proxy server and a reverse proxy server perform different and distinct functions in different environments. In this description and in the claims, a "reverse proxy server" is not included within the definition of "proxy server."

The environment of FIG. 3 also includes an external client 340 that is entirely outside of the private corporate network 310 and is separated from the private corporate network 310 through a public network 320 such as the Internet. Often, authorized users of the private corporate network 310 may not have access to a browser client that is within the private corporate network. For example, the authorized user may be at home, traveling, or otherwise outside of the private corporate network. In this case, it is often desirable to access internal resources 315 such as files or e-mail within the private corporate network 320.

As mentioned above, external clients currently establish a secure channel of communication with the private corporate network using Point-to-Point Tunneling Protocol (PPTP protocol). However, PPTP protocol is implemented below the socket layer 203 (in the lower layers 204) of the protocol stack 200. Thus, when the PPTP connection is being implemented, the execution cannot call upon the socket layer 203 to establish further connections for the network interface device. Therefore, once a PPTP connection is established with the private corporate network using the network interface device in the external client, the network interface device must transfer data only through the PPTP connection.

To the extent that the external client has a secure channel of communication with the private corporate network and must work through the private corporate network when a PPTP channel is established, the PPTP channel forms a Virtual Privacy Network (VPN) with the private corporate network. In other words, while the PPTP channel is established, if the external client is to access another resource such as external resources 230 that are also outside of the private corporate network 210, the communications are routed through the private corporate network 210. The proxy server 212 then routes the request back out to the desired external resources, just as the proxy server would do if the external client 240 was part of the private corporate network.

Figure 4:
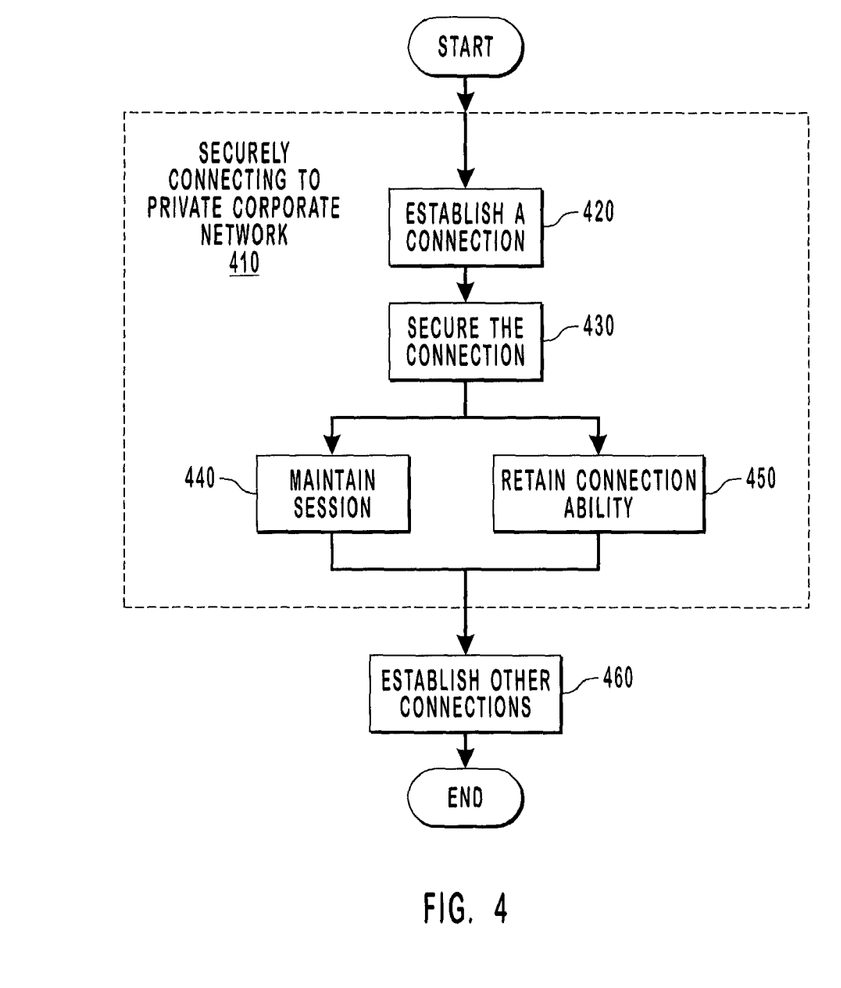
FIG. 4 illustrates a flowchart of a method of establishing a secure connection to a private corporate network over a public network while retaining the ability to establish further connections in accordance with the present invention.

The present invention eliminates the restriction of the external client 340 having to always work through the private corporate network 300 in order to access external resources 230. FIG. 4 illustrates a flowchart of a method for the communications device of the external client 340 establishing a secure connection over the public network 320 with the private corporate network 310 (specifically, with the VPN access server 314). The method is implemented without restricting the communications device (and associated external client) to working through the private corporate network 310. FIG. 3 and FIG. 4 will be referred to frequently in describing the method of FIG. 4.

Referring to FIG. 4, embodiments within the scope of the present invention include a step for securely connecting to the private corporate network 300 while retaining the ability to establish a separate and distinct connection with another resource such as external resource 230 outside of the private corporate network (step 410). An example of corresponding acts that, when combined, produce the result of this step is now described with reference to acts 420, 430, 440, and 450.

In act 420, the external client establishes a connection with a Virtual Privacy Network (VPN) server 314 within the private corporate network. In this description and in the claims, a "VPN" server is defined as a private corporate network server that facilitates the establishment of a secure connection between the server and an external client outside of the private corporate network. The external client establishes this connection using the socket layer 203, which may be, for example, the TCP protocol The VPN server 314 also contains corresponding software (such as corresponding TCP protocol software) and hardware that facilitates the establishment of the connection. The VPN server 314 may or may not be implemented on the same server machine as the proxy server 312.

In act 430, the external client secures the connection 430. Connections may be secured by conventional encryption/decryption crypts and by authentication methods. The security of the connection is established by a protocol layer that is at or above the socket layer 203 in the protocol stack 200. The security for the connection may be provided by using Secured Socket Layer (SSL) protocol or Wireless Transport Layer Security (WTLS) security. In act 440, the session corresponding to the connection is maintained potentially by the same protocol that is used to establish the connection in the case of SSL or WTLS protocols.

In act 450, the external client's ability to establish further connections is retained. This may be accomplished by using a layer at or above the socket layer in order to establish security between the external client and the private corporate network. SSL and WTLS exist at or above the socket layer and, therefore, the SSL or WTLS layers may implement the socket layer 203 to establish further connections.

In act 460, the external computer system does indeed establish further connections. In one example, these connections are with external resources 330 outside of the private corporate network, thereby allowing the external client the flexibility to communicate directly with the external resource rather than channel communications to an external resource through the private corporate network This improves routing efficiency and improves the efficiency and security of the private corporate network.

The use of protocols above the socket layer in the protocol stack is also advantageous in that if the connection is lost, the session may be resumed without having to go through all of the original communications needed to establish the connection in the first place. Typically, the session state including any encryption/decryption keys would be stored in memory and would persist despite a lost connection The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment that includes a public network and a private network, the public network including a client external to the private network, a method of a communications device of the external client establishing a secure connection over a public network to the private network without restricting the communications device to working through the private network, the method comprising the following:

a specific act of the external client establishing a connection with a virtual private network access server of the private network over the public network using the communication device, the virtual private network server providing the external client access to the private network as though the external client is part of the private network;

a specific act of the external client providing security to the connection through a communication protocol that resides at or above a socket layer in a protocol stack the external client uses to communicate data;

a specific act of the external client maintaining a session that uses the secure connection to communicate with the private network; and during at least a portion of the specific act of the external client maintaining a session that uses the secure connection, a specific act of the communication device retaining the ability to establish a separate and distinct connection with another resource outside of the private network.

2. A method in accordance with claim 1, further comprising:

during at least a portion of the specific act of the external client maintaining a session that uses the secure connection, a specific act of establishing a connection with the resource outside of the private network.

3. A method in accordance with claim 1, wherein the specific act of the external client establishing a connection with the private network comprises:

a specific act of using Transmission Control Protocol (TCP) to establish a connection with the private network.

4. A method in accordance with claim 3, wherein the specific act of the external client providing security to the connection comprises:

a specific act of the external client using a Secure Socket Layer (SSL) protocol to provide security to the connection.

5. A method in accordance with claim 1, wherein the specific act of the external client providing security to the connection comprises:

a specific act of the external client using a Secure Socket Layer (SSL) protocol to provide security to the connection.

6. A method in accordance with claim 1, wherein the specific act of the external client providing security to the connection comprises:

a specific act of the external client using a Wireless Transport Layer Security (WTLS) to provide security to the connection.

7. A method in accordance with claim 1, wherein the Virtual Private Network (VPN) access server is implemented on the same server machine as a proxy server that serves the private network.

8. A method in accordance with claim 1, wherein the Virtual Private Network (VPN) access server is implemented on a different server machine than a proxy server that serves the private network.

9. A method in accordance with claim 1, wherein the public network comprises portions of the Internet.

10. In a computer program product for use in a network environment that includes a public network and a private network, the public network including a client external to the private network, the computer program product for implementing a method of a communications device of the external client establishing a secure connection over a public network to the private network without restricting the communications device to working through the private network, the computer program product including a computer-readable medium having stored thereon computer-executable instructions for performing the following:

a specific act of the external client establishing a connection with a virtual private network access server of the private network, over the public network using the communication device, the virtual private network server providing the external client access to the private network as though the external client is part of the private network;

a specific act of the external client providing security to the connection through a communication protocol that resides at or above a socket layer in a protocol stack the external client uses to communicate data;

a specific act of the external client maintaining a session that uses the secure connection to communicate with the private network; and during at least a portion of the specific act of the external client maintaining a session that uses the secure connection, a specific act of the communication device retaining the ability to establish a separate and distinct connection with another resource outside of the private network.

11. A computer program product in accordance with claim 10, wherein the computer-readable media comprises a tangible computer readable medium.

12. A computer program product in accordance with claim 10, wherein the computer-executable instructions for performing the specific act of the external client establishing a connection with the private network comprises a Transmission Control Protocol (TCP) module.

13. A computer program product in accordance with claim 12, wherein the computer-executable instructions for performing a specific act of the external client providing security to the connection comprises a Secure Socket Layer (SSL) module.

14. A computer program product in accordance with claim 10, wherein the computer-executable instructions for performing a specific act of the external client providing security to the connection comprises a Secure Socket Layer (SSL) module.

15. A computer program product in accordance with claim 10, wherein the computer-executable instructions for performing a specific act of the external client providing security to the connection comprises a Wireless Transport Layer Security (WTLS) module.

16. In a network environment that includes a public network and a private network, the public network including a client external to the private network, a method of a communications device of the external client establishing a secure connection over a public network to the private network without restricting the communications device to working through the private network, the method comprising the following:

a step for securely connecting to a virtual private network access server of the private network through a communication protocol that resides at or above a socket layer in a protocol stack that the external client uses to communicate data in order to retain the ability to establish a separate and distinct connection with a resource outside of the private network, the virtual private network access server providing the external client access to the private network as though the external client is part of the private network; and while securely connected to the virtual private network access server, a specific act of accessing the resource outside, of the private network.

17. A method in accordance with claim 16, wherein the step for securely connecting to the private network comprises the following:

a specific act of the external client establishing a connection with the private network over the public network using the communication device;

a specific act of the external client providing security to the connection; and a specific act of the external client maintaining a session that uses the secure connection to communicate with the private network.

18. A method in accordance with claim 9, wherein the public network comprises portions of the Internet.

19. In a network environment that includes a public network and a private network connected to the public network, the public network including a client external to the private network, a method of a server computer system within a private network establishing a secure connection with a communications device of the external client without restricting the communications device to working through the private network, the method comprising the following:

a specific act of a virtual private network access server within the private network facilitating the establishment of a connection with the external client over the public network, the virtual private network server providing the external client access to the private network as though the external client is part of the private network; and a specific act of the server computer system facilitating the providing of security to the connection through a communication protocol that resides at or above a socket layer in a protocol stack used to communicate data, wherein the secure connection is established while allowing the external client to maintain the ability to establish a separate and distinct connection directly with one or more external resources rather than having to route communication with the one or more external resources through the private network.

20. A method in accordance with claim 19, wherein the public network comprises portions of the Internet.

21. A method in accordance with claim 19, wherein the specific act of the server computer system facilitating the establishment of a connection with the external client comprises:

a specific act of using Transmission Control Protocol (TCP), to facilitate the establishment of a connection with the external client.

22. A method in accordance with claim 19, wherein the specific act of the server computer system facilitating the providing of security to the connection comprises:

a specific act of using Secure Socket Layer (SSL), to facilitate the providing of security to the connection.

23. A method in accordance with claim 19, wherein the specific act of the server computer system facilitating the providing of security to the connection comprises:

a specific act of using Wireless Transport Layer Security (WTLS), to facilitate the providing of security to the connection.

* * * * *